United States Patent
McCollom

(10) Patent No.: US 9,242,552 B2
(45) Date of Patent: Jan. 26, 2016

(54) INSERT FOR A CAPLESS FUEL TANK FILLER NECK TO TEST A FUEL TANK FOR LEAKS

(75) Inventor: Gregory M. McCollom, Anaheim, CA (US)

(73) Assignee: STAR EnviroTech, Inc., Huntington Beach, CA (US)

( * ) Notice: Subject to any disclaimer, the term of this patent is extended or adjusted under 35 U.S.C. 154(b) by 339 days.

(21) Appl. No.: 13/344,217

(22) Filed: Jan. 5, 2012

(65) Prior Publication Data
US 2013/0175268 A1    Jul. 11, 2013

(51) Int. Cl.
| | |
|---|---|
| *G01M 3/10* | (2006.01) |
| *B65D 39/00* | (2006.01) |
| *B60K 15/04* | (2006.01) |
| *F02M 37/00* | (2006.01) |
| *F02M 25/08* | (2006.01) |

(52) U.S. Cl.
CPC ............ *B60K 15/04* (2013.01); *F02M 25/0818* (2013.01); *F02M 37/0076* (2013.01); *B60K 2015/0429* (2013.01)

(58) Field of Classification Search
USPC ............ 141/350, 331, 363, 340, 372, 59, 65; 222/569; 220/86, 86.2, 86.1, DIG. 33; 73/866.5, 40–49.8, 49.7; 180/69.4
See application file for complete search history.

(56) References Cited

U.S. PATENT DOCUMENTS

| | | | | |
|---|---|---|---|---|
| 3,583,210 | A | * | 6/1971 | Orr ................................. 73/49.2 |
| 5,425,266 | A | * | 6/1995 | Fournier ........................ 73/49.7 |
| 2009/0139606 | A1 | * | 6/2009 | Peddle et al. ................. 141/350 |
| 2010/0078094 | A1 | * | 4/2010 | Trippi, Jr. ..................... 141/350 |
| 2010/0326567 | A1 | * | 12/2010 | McCollom .................... 141/368 |

OTHER PUBLICATIONS

Say GoodBye to Fuel Caps!!!!! (with PICS) Nov. 20, 2007 Boomer http://themustangsource.com/forums/f697/say-goodbye-fuel-caps-pics-460442/ capless_neck_and_insert.pdf.*

* cited by examiner

*Primary Examiner* — Mickey Yu
*Assistant Examiner* — Allan Stevens
(74) *Attorney, Agent, or Firm* — Morland C. Fischer

(57) ABSTRACT

A filler neck insert to be removably attached to a capless fuel tank filler neck of a motor vehicle so that a source of pressure or a source of vacuum can be coupled to the fuel tank in order to test the fuel tank for leaks. The filler neck insert includes a hollow tubular body to be received through the open fuel-mouth and suspended within the throat of the fuel tank filler neck and a base extending across the tubular body. An adapter which is connected to the filler neck insert has an outer rim mated in surrounding sealing engagement with the base of the insert and an inlet tube connected to the source of pressure or vacuum. Accordingly, a flow path is established from the pressure or vacuum source to the fuel tank by way of the adapter, the insert and the filler neck.

9 Claims, 4 Drawing Sheets

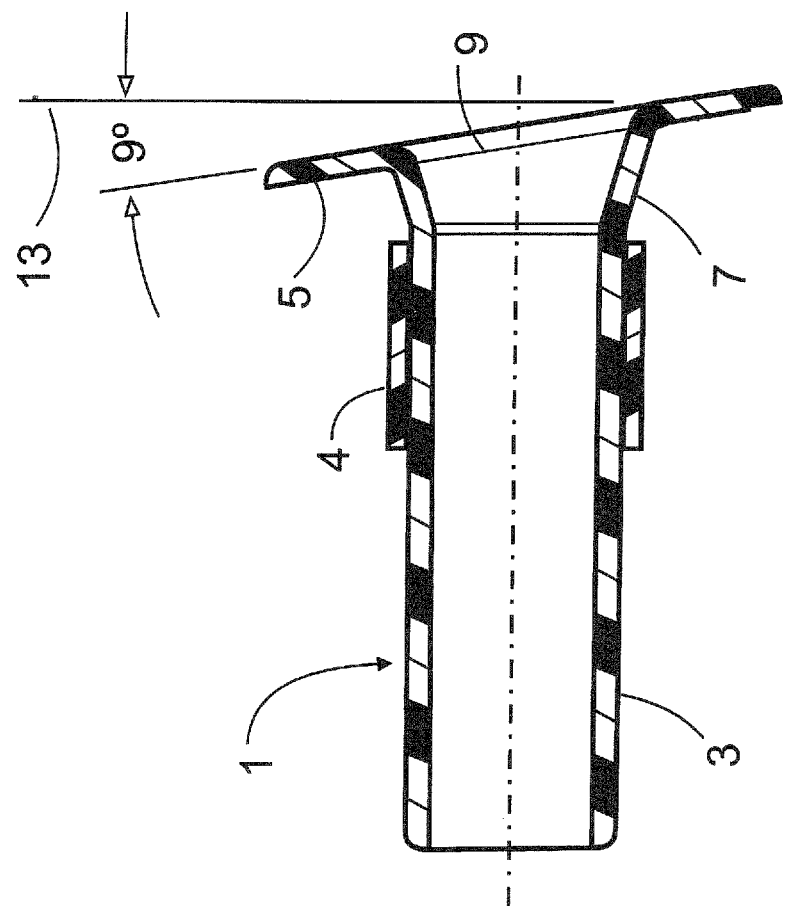

INSERT FOR A CAPLESS FUEL TANK FILLER NECK TO TEST A FUEL TANK FOR LEAKS

BACKGROUND OF THE INVENTION

1. Field of the Invention

This invention relates to a filler neck insert to be removably attached to a capless fuel tank filler neck of a motor vehicle so that a source of pressure (e.g., a vapor) or a source of vacuum can be coupled to the fuel tank of the vehicle by way of the filler neck insert and the filler neck to enable the fuel tank to be tested for leaks.

2. Background Art

Fuel tanks, vapor lines and components associated therewith of a motor vehicle are known to experience cracks, holes and fissures for a variety of reasons. By way of a first example, a rock or another object encountered along the roadway may strike the fuel tank while the vehicle is in motion. By way of another example, normal wear and tear and/or the caustic effects of gasoline may, over time, cause the fuel tank, vapor lines and components to degrade. In either case, because the damage caused to the fuel tank is typically very small, such damage is often difficult to detect and locate to enable repairs to be made. The result of not being able to accurately locate and repair the damage is that fuel fluid and/or vapor may leak from the fuel tank, vapor lines or components, whereby the environment is exposed to toxic fumes.

It has been known to generate and deliver a visible vapor (sometimes known as "smoke") to a closed fluid system in order to detect the presence and location of leaks by visually inspecting the system for any vapor escaping therefrom. In this regard, vapor can be delivered to a fuel tank by way of the fuel tank filler neck in order to pressurize the fuel tank to be tested for leaks. However, in the case of a capless fuel tank filler neck, it has proven to be difficult to reliably couple a source of pressure to the throat of the filler neck. It has also proven to be difficult to adequately maintain the pressure in the tank to enable a pressure test to be completed. That is, because of its construction, pressure has been known to leak from the fuel tank as a consequence of inadequate sealing between the pressure source and the filler neck.

What would therefore be desirable is a low-cost, easy to install, and reusable insert by which a pressure or vacuum source can be efficiently and reliably coupled to a capless fuel tank filler neck of the fuel tank of a motor vehicle so that the fuel tank can be tested for leaks.

SUMMARY OF THE INVENTION

In general terms, an insert is disclosed to be removably attached to a capless fuel tank filler neck of a fuel tank of a motor vehicle so that the fuel tank, its vapor lines and components can all be tested for leaks. By virtue of the foregoing, a source of pressure or a source of vacuum can be coupled to the fuel tank by way of the insert and the filler neck. In the case where a pressure source is to be coupled to the fuel tank, a supply of gas (a vapor sometimes known as "smoke") pressurizes the fuel tank in order that a pressure-decay test can be performed or the fuel tank visually monitored for smoke escaping therefrom. In the case where a vacuum source is to be coupled to the fuel tank, a vacuum is created in the tank so that a vacuum-decay test can be performed.

The filler neck insert includes a hollow tubular body that is positioned through the open fuel mouth and down the throat of the capless fuel tank filler neck to cause a normally-closed spring-biased door which extends across the throat to rotate to an open position. A (e.g., resilient) sealing band surrounds the tubular body of the insert to create a sealing surface against the throat of the filler neck to prevent the loss of pressure or vacuum within the fuel tank during testing. A relatively wide disk-like base slopes across one end of the tubular body of the insert. The base is seated over the fuel mouth of the filler neck by which the tubular body of the insert is suspended within the throat of the filler neck. An inlet opening formed through the base of the insert communicates with the hollow tubular body thereof to create a flow path to the fuel tank by way of the filler neck. The aforementioned pressure or vacuum is applied to the filler neck insert at the vapor inlet opening formed through the base.

To facilitate coupling the source of pressure or vacuum to the fuel tank, it may be desirable to locate an adapter between the pressure or vacuum source and the filler neck insert. Such an insert includes a cylindrical rim which surrounds and sealably engages the disk-like base of the filler neck insert, whereby the insert and the adapter are connected to one another. A hollow inlet tube extending from the rim creates a flow path through the adapter. The source of pressure or vacuum is connected to the adapter at the hollow inlet tube thereof. Accordingly, the pressure or vacuum is delivered to the fuel tank via the respective flow paths of the adapter and the insert and the fuel tank filler neck within which the tubular body of the insert is suspended.

BRIEF DESCRIPTION OF THE DRAWINGS

FIG. 3 is a cross-section of the filler neck insert of FIGS. 1 and 2;

DESCRIPTION OF THE PREFERRED EMBODIMENT

Figure 2:
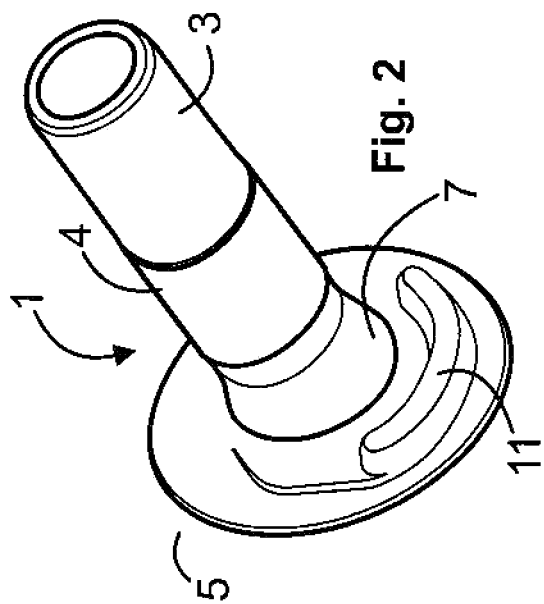
FIGS. 1 and 2 are perspective views of a filler neck insert according to a preferred embodiment of this invention to be removably attached to a capless fuel tank filler neck of a fuel tank of a motor vehicle to enable the fuel tank, its vapor lines and components to be tested for leaks.
Figure 1:
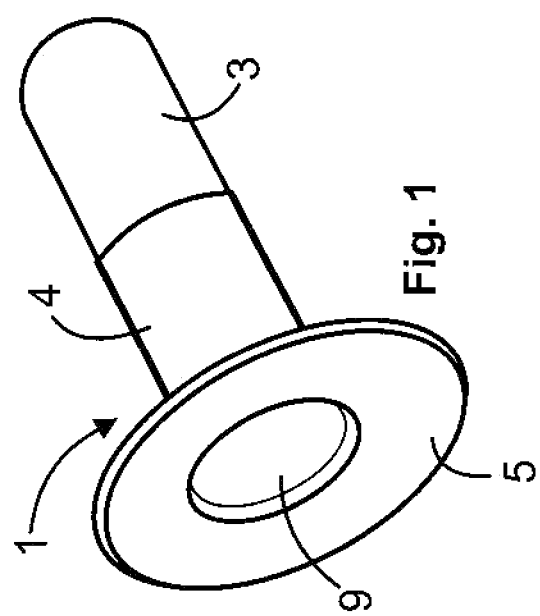

A low cost, easy-to-install insert 1 to be mated to a capless filler neck of the fuel tank of a motor vehicle is described while referring concurrently to FIGS. 1-3 of the drawings. As will be described in greater detail hereinafter while referring to FIGS. 4 and 5, the insert 1 is removably attached to the filler neck to establish a flow path by which a source of pressure or a source of vacuum can be reliably coupled to the fuel tank by way of the fuel tank filler neck. For example, where a pressure source is to be coupled to the fuel tank, a supply of gas (i.e., a vapor sometimes known as "smoke") may be introduced to the fuel tank to enable the fuel tank and its vapor lines and components to be tested for leaks without losing pressure.

According to a preferred embodiment, the filler neck insert 1 includes a hollow tubular body 3 through which the vapor will be supplied to the motor vehicle fuel tank by way of the fuel tank filler neck. A resilient (e.g., rubber) sealing band 4 surrounds the tubular body 3. The tubular body 3 is joined to a disk-like base 5 by a flared neck or horn 7. An inlet opening 9 is formed through the base 5 of insert 1 so as to lie in fluid communication with the tubular body 3 thereof. The filler neck insert 1 is preferably manufactured from plastic (e.g., Delrin) or any other suitable material that will be able to withstand the caustic environment in which it will be used.

As is best shown in FIG. 2, a step or riser 11 is formed (e.g., molded) in the bottom of the base 5 of the filler neck insert 1. The step 11 enables the base 5 to be seated so as to extend across the open fuel mouth of the capless fuel tank filler neck whereby the tubular body 3 of the insert 1 will be coaxially aligned with the throat of the filler neck when it is desirable to test the fuel tank for leaks.

As is best shown in FIG. 3, the base 5 of the filler neck insert 1 is sloped across one end of the tubular body 3 so as to make a small angle (e.g., of about nine degrees) with respect to a horizontal reference line 13 that runs over top the inlet opening 9 through base 5. When the filler neck insert 1 is removably attached to the capless fuel tank filler neck (in the manner shown in FIG. 5), the sloped base 5 cooperates with the step 11 to cause the tubular body 3 of insert 1 to be suspended within and automatically positioned in coaxial alignment with the throat of the filler neck so that a smooth flow of vapor can be delivered to the fuel tank.

Figure 4:
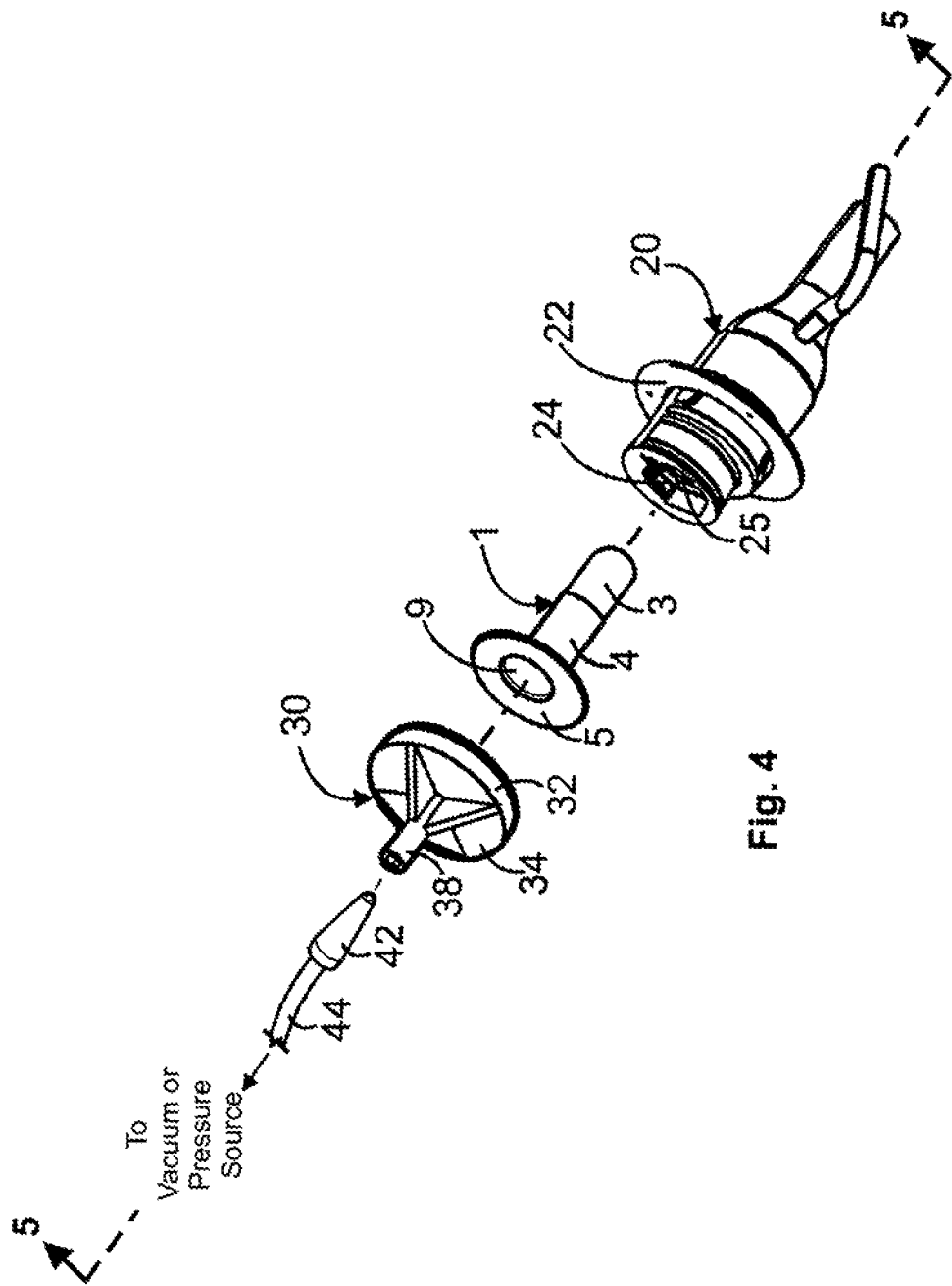
FIG. 4 is an exploded view showing a source of pressure or vacuum to be coupled to the capless fuel tank filler neck by way of the filler neck insert of FIGS. 1 and 2 and an adapter to be connected to the insert.

Turning now to FIG. 4 of the drawings, the filler neck insert 1 according to the preferred embodiment of this invention is shown ready to be attached to the capless fuel tank filler neck 20 which is affixed to the chassis of the motor vehicle by means of a filler neck mounting ring 22. It is to be understood that a pressure or vacuum can be delivered directly to the filler neck insert 1 without any intermediate coupler. In this case, a pressure or a suction force will be applied to the vehicle fuel tank via the inlet opening 9 and hollow tubular body 3 of insert 1 and the filler neck 20.

In another case, it may be desirable to attach an adapter to the filler neck insert 1 to facilitate coupling a source of pressure or a source of vacuum to the fuel tank. Continuing in this regard to refer to FIG. 4, such an adapter 30 is shown to be connected to the insert 1. Adapter 30 has been previously illustrated and described in co-pending patent application Ser. No. 12/459,274 filed Jun. 30, 2009 and assigned to the assignee of the instant application, To this end, the description of the adapter 30 from the aforementioned earlier-filed patent application is incorporated herein by reference.

Briefly, however, adapter 30 is manufactured from a flexible (e.g., rubber) material that is capable of being stretched. Adapter 30 includes a cylindrical rim 32 that surrounds a flat base 34 having an entry port 36 (best shown in FIG. 5) formed therethrough. A hollow inlet tube 38 extends from the base 34 so as to lie in axial alignment and communicate with entry port 36. The rim 32 of the flexible adapter 30 is stretched in order to surround and form a seal against the base 5 of the filler neck insert 1. The insert 1 is thusly held in sealing engagement with the adapter 30 so that a continuous flow path is created (best shown in FIG. 5) through the inlet tube 38 of adapter 30 and the tubular body 3 of filler neck insert 1. The insert 1 and the adapter 30 may be fixedly or detachably connected to one another as a single piece or separate pieces by means of vulcanization, an adhesive, a pressure fit, or the like.

Figure 5:
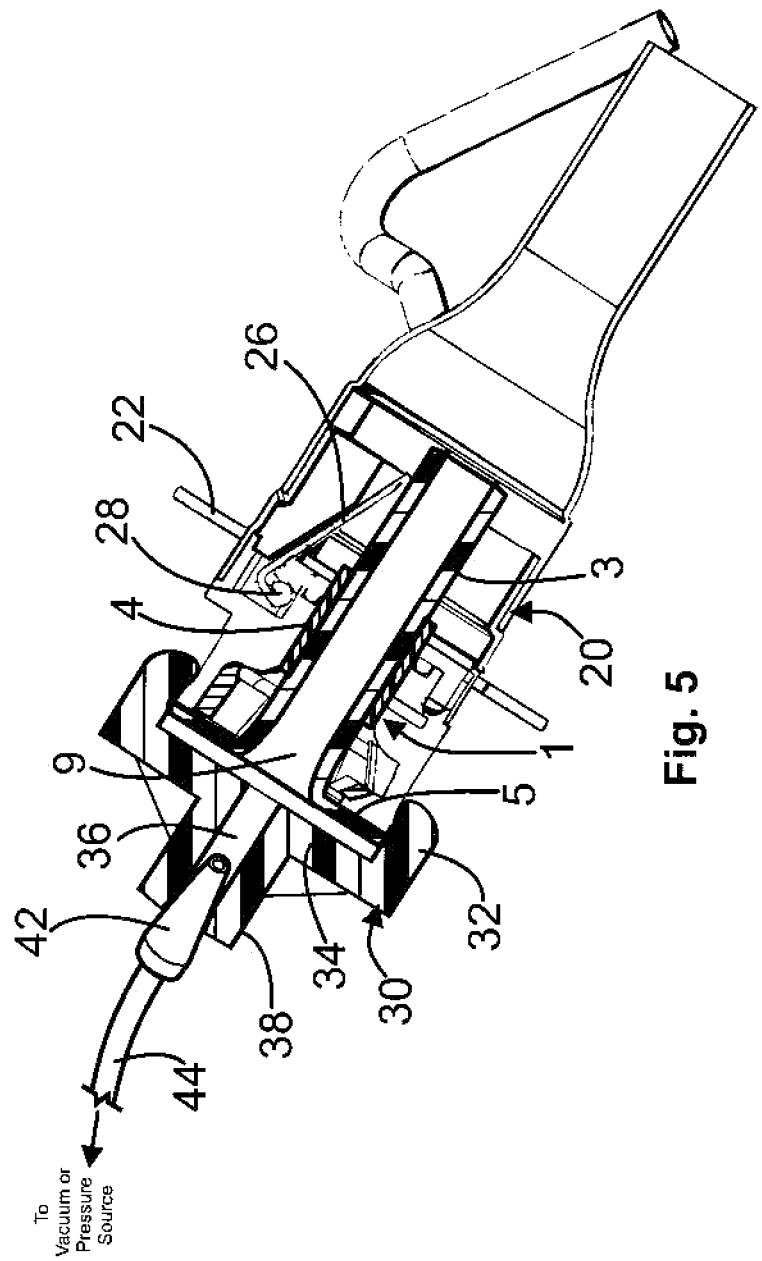
FIG. 5 shows a flow path created from the pressure or vacuum source to the capless fuel tank filler neck when the adapter of FIG. 4 is connected to the filler neck insert.

To test a fuel tank for leaks, and referring to FIGS. 4 and 5 of the drawings, the hollow tubular body 3 of the filler neck insert 1 is inserted through the open fuel mouth 24 and down the throat of the capless fuel tank filler neck 20. Accordingly, the base 5 of insert 1 extends over and across the fuel mouth 24, and the tubular body 3 of insert 1 is suspended within the throat. The adapter 30 which is mated in surrounding engagement with the insert 1 is disposed above the open fuel mouth 24 of filler neck 20. As is best shown in FIG. 5, the hollow tubular body 3 of insert 1 moving downwardly through the throat of the filler neck 20 applies a pushing force against the spring-biased door 26 which normally extends across and closes the capless filler neck 20. The pushing force generated by the tubular body 3 of insert 1 causes door 26 to rotate at a hinge 28 so as to open the filler neck 20 and thereby permit the fuel tank to be coupled to a source of pressure or vacuum as will be described. The sealing band 4 surrounding the tubular body 3 of insert 1 lays against the throat of the filler neck 20 to prevent the loss of pressure or vacuum to which the fuel tank will be subjected during testing.

As was earlier explained, one method by which to test the fuel tank for leaks is to use a vapor (i.e., "smoke") to pressurize the tank. Such a vapor can be created by heating a liquid petroleum to convert the liquid to a visible vapor. Reference may be made to U.S. Pat. Nos. 6,142,009; 6,526,808 and 6,477,890 for examples of a smoke generator to create the vapor necessary to fill and pressurize the fuel tank undergoing testing.

FIG. 5 shows the vapor supply nozzle 42 of a smoke generator (not shown) detachably connected to and communicating with the inlet tube 38 of the adapter 30. The vapor supply nozzle 42 receives a supply of visible smoke, under pressure, from the smoke generator via a vapor supply hose 44. The vapor is delivered from nozzle 42 to the fuel tank under test by way of a vapor delivery path including the inlet tube 38 and entry port 36 of the adapter 30, the inlet opening 9 and tubular body 3 of the filler neck insert 1, and the filler neck 20. Once it is pressurized, the fuel tank (and its vapor lines and components) is monitored for leaks by conventional testing methods such as, for example, visually looking for the escape of smoke from a leak or performing a mechanical pressure-decay test.

Rather than pressurizing the fuel tank with a vapor, as just described, any other source of suitable gas (e.g., air or nitrogen) can be supplied to the inlet tube 38 of the adapter 30 to fill the fuel tank. The gas will pressurize the fuel tank to enable leaks to be detected by means of a conventional pressure decay test or the like. As was also explained, a source of vacuum can be used in place of the aforementioned vapor/gas pressure source to be connected to the inlet tube 38 of adapter 30. In this case, a suction path will be established from the fuel tank to the vacuum source via the filler neck 20, the tubular body 3 and inlet opening 9 of the filler neck insert 1, and the entry port 36 and inlet tube 38 of adapter 30 in order to enable leaks to be detected by means of a conventional vacuum decay test or the like. Reference may be made to U.S. Pat. No. 7,387,014 for an example of a suitable vacuum-generating device.

At the conclusion of the leak testing process, the vapor supply nozzle 42 is detached from the inlet tube 38 of the adapter 30, and the filler neck insert 1 is withdrawn from the fuel tank filler neck 20. The door 26 will automatically rotate to its normally closed position extending across the throat of the filler neck 20. The filler neck insert 1 or the combination of insert 1 and adapter 30 may be advantageously reused to test the fuel tanks of different vehicles.

The invention claimed is:

1. A capless fuel tank filler neck of a motor vehicle by which fuel is delivered to a fuel tank of the motor vehicle, where the capless fuel tank filler neck has an open fuel mouth and a throat through which the fuel flows to the fuel tank, and where the capless fuel tank filler neck has a closure being initially positioned across the throat thereof to block access to the fuel tank, and an insert to be removably attached to the capless fuel tank filler neck by which to couple a source of pressure or vacuum to the fuel tank so that the fuel tank can be tested for leaks, said insert comprising a hollow elongated flow tube to be inserted through the open fuel mouth and down the throat of the filler neck when said insert is attached to the filler neck, said hollow elongated flow tube having a length such that one end of said hollow elongated flow tube makes direct contact with and applies a pushing force to the closure in order to displace the closure initially positioned across the throat of the filler ck so as to unblock access to the fuel tank, said insert also comprising a base extending across said hollow elongated flow tube to cover and lay flush against the open fuel mouth of the filler neck, said hollow elongated flow tube extending from said base, such that said hollow elongated flow tube is suspended within the filler neck from said base, said base having an inlet opening formed therethrough and communicating with said hollow elongated flow tube, the inlet opening through said base coupled to the source of pressure or vacuum, whereby a flow path is established from the source of pressure or vacuum to the fuel tank by way of the hollow elongated flow tube of said insert and the filler neck when said closure has been displaced by said hollow elongated flow tube and access to the fuel tank is thereby unblocked.

2. The insert recited in claim 1, further comprising a sealing surface surrounding the hollow elongated flow tube of said insert to provide a seal against the throat of the capless fuel tank filler neck when said insert is removably attached to the filler neck and the hollow elongated flow tube of said insert is inserted through the open fuel mouth and down the throat of the filler neck.

3. The insert recited in claim 1, wherein said hollow elongated flow tube has a longitudinal axis, the base of said insert extending across said tube on a slope so that an angle is formed between said base and the longitudinal axis of said tube, said angle being other than 90 degrees.

4. A combination, comprising:
a capless fuel tank filler neck communicating with a fuel tank of a motor vehicle through which fuel is delivered to the fuel tank, said capless fuel tank filler neck having a closure positioned therewithin to block access to the fuel tank;
an insert to be removably attached to the capless fuel tank filler neck; and
an adapter including an inlet tube connected between said insert and one of a source of pressure or a vacuum,
said insert including a hollow tube lying within the capless fuel tank filler neck and having a length such that one end of said hollow flow tube makes direct contact with and applies a pushing force to the closure in order to displace the closure within said filler neck so as to unblock access to the fuel tank, whereby a continuous flow path is established from the one of said source of pressure or said vacuum to the fuel tank by way of the inlet tube of said adapter, the hollow flow tube of said insert, and the capless fuel tank filler neck so that the fuel tank can be tested for leaks.

5. The combination recited in claim 4, wherein said insert also has a base extending across said hollow flow tube thereof and lying flush against the fuel tank filler neck, said base having an inlet opening formed therethrough, said inlet opening lying between and communicating with the inlet tube of said adapter and the hollow flow tube of said insert.

6. The combination recited in claim 5, wherein said adapter also has an outer rim connected in sealing engagement with the base of said insert, whereby the inlet opening formed through said base communicates with the inlet tube of said adapter and the hollow flow tube of said insert.

7. The combination recited in claim 6, wherein the outer rim of said adapter lies in surrounding engagement with the base of said insert by which said adapter is connected to said insert.

8. The combination recited in claim 4, wherein said insert also has a resilient sealing surface surrounding the hollow flow tube thereof to provide a seal against the fuel tank filler neck when the hollow flow tube of said insert is located within the filler neck.

9. The combination recited in claim 5, wherein the base of said insert extends across said hollow flow tube on a slope so that an angle is formed between said base and the longitudinal axis of said tube, said angle being less than 90 degrees.

* * * * *